(12) United States Patent
Spitler et al.

(10) Patent No.: US 9,968,876 B1
(45) Date of Patent: May 15, 2018

(54) METHOD OF MANUFACTURING FIBERGLASS FILTRATION MEDIA

(71) Applicants: Charles Douglas Spitler, Southlake, TX (US); Rodney Ray Wilkins, Granville, OH (US)

(72) Inventors: Charles Douglas Spitler, Southlake, TX (US); Rodney Ray Wilkins, Granville, OH (US)

(73) Assignee: Superior Fibers, LLC, Reedsville, WV (US)

( * ) Notice: Subject to any disclaimer, the term of this patent is extended or adjusted under 35 U.S.C. 154(b) by 0 days. days.

(21) Appl. No.: 15/490,803

(22) Filed: Apr. 18, 2017

Related U.S. Application Data

(63) Continuation of application No. 15/255,136, filed on Sep. 1, 2016, which is a continuation-in-part of application No. 15/224,175, filed on Jul. 29, 2016, which is a continuation-in-part of application No. 15/151,478, filed on May 10, 2016, now Pat. No. 9,695,084, said application No. 15/224,175 is a continuation-in-part of application No. 14/181,426, filed on Feb. 14, 2014, now Pat. No. 9,446,978.

(Continued)

(51) Int. Cl.
| | |
|---|---|
| *B01D 46/10* | (2006.01) |
| *B29C 53/66* | (2006.01) |
| *D04H 3/004* | (2012.01) |
| *D04H 3/02* | (2006.01) |
| *D04H 3/12* | (2006.01) |
| *B01D 46/00* | (2006.01) |
| *C03B 37/02* | (2006.01) |
| *D04H 3/03* | (2012.01) |

(52) U.S. Cl.
CPC ......... *B01D 46/0001* (2013.01); *B01D 46/10* (2013.01); *B29C 53/66* (2013.01); *C03B 37/0206* (2013.01); *D04H 3/004* (2013.01); *D04H 3/02* (2013.01); *D04H 3/03* (2013.01); *D04H 3/12* (2013.01); *B01D 2275/10* (2013.01); *B01D 2275/305* (2013.01); *D10B 2505/04* (2013.01)

(58) Field of Classification Search
CPC .......................... B01D 46/0001; B01D 46/10; B01D 2275/10; B01D 2275/305; B01D 2275/307; B29C 53/66; B29C 53/665; B29C 53/8041; B29C 67/248; D04H 3/004; D04H 3/02; D04H 3/07; D04H 3/073; D04H 3/12
See application file for complete search history.

(56) References Cited

U.S. PATENT DOCUMENTS

| | | |
|---|---|---|
| 2,081,060 A | 5/1937 | Modigliani |
| 2,357,676 A | 9/1944 | Mack |

(Continued)

FOREIGN PATENT DOCUMENTS

WO    2011106537 A1    9/2011

*Primary Examiner* — Michael A Tolin
(74) *Attorney, Agent, or Firm* — Bakos & Kritzer

(57) ABSTRACT

The manufacture of fiberglass filtration media, and particularly paint arrestance fiberglass media, is disclosed. Fiberglass filtration media is formed in part by controlling the speed of a melter traversing a drum. The fiberglass media passes through rollers and water sprays before it enters a curing apparatus. Progressive density changes from the air intake side to the air exit side of the media result in increased filtration qualities.

19 Claims, 9 Drawing Sheets

Related U.S. Application Data

(60) Provisional application No. 62/282,444, filed on Jul. 31, 2015, provisional application No. 62/179,572, filed on May 11, 2015.

(56) References Cited

U.S. PATENT DOCUMENTS

| | | | |
|---|---|---|---|
| 2,460,899 A | 2/1949 | Modigliani et al. | |
| 2,486,217 A * | 10/1949 | Slack | D04H 3/02 19/161.1 |
| 2,505,045 A * | 4/1950 | Holcomb | C04B 26/02 156/166 |
| 2,546,230 A | 3/1951 | Modigliani | |
| 2,574,221 A * | 11/1951 | Modigliani | B29C 70/00 156/167 |
| 2,609,320 A | 9/1952 | Modigliani | |
| 2,644,780 A * | 7/1953 | Simkins | C03B 37/075 156/174 |
| 2,729,582 A | 1/1956 | Modigliani | |
| 2,751,483 A | 6/1956 | Keen et al. | |
| 2,779,969 A | 2/1957 | Bose | |
| 2,798,531 A * | 7/1957 | Jackson, Jr. | B01D 29/111 156/174 |
| 2,913,037 A | 11/1959 | Modigliani | |
| 2,964,439 A | 12/1960 | Modigliani | |
| 2,997,096 A | 8/1961 | Morrison et al. | |
| 3,051,602 A * | 8/1962 | Schairbaum | B65H 54/28 156/167 |
| 3,082,615 A | 3/1963 | Alvarez de Toledo | |
| 3,096,161 A | 7/1963 | Morrison et al. | |
| 3,097,710 A * | 7/1963 | Copenhefer | C03B 37/085 177/115 |
| 3,134,704 A | 5/1964 | Modigliani | |
| 3,278,282 A | 10/1966 | Jaray | |
| 3,322,585 A | 5/1967 | Weber et al. | |
| 3,459,613 A | 8/1969 | Copenhefer et al. | |
| 3,476,635 A | 11/1969 | Heh | |
| 3,526,488 A | 9/1970 | Schweppe et al. | |
| 3,526,557 A | 9/1970 | Taylor, Jr. | |
| 3,573,016 A | 3/1971 | Rees | |
| 3,623,857 A | 11/1971 | McFadden et al. | |
| 3,826,903 A | 7/1974 | Varasso | |
| 3,837,138 A | 9/1974 | Terry | |
| 3,937,860 A | 2/1976 | Gusman et al. | |
| 4,121,918 A | 10/1978 | Shono et al. | |
| 4,188,197 A | 2/1980 | Amberkar et al. | |
| 4,227,906 A | 10/1980 | Reiser | |
| 4,263,007 A * | 4/1981 | Battigelli | B29C 35/06 425/371 |
| 4,321,074 A | 3/1982 | Glaser et al. | |
| 4,334,468 A | 6/1982 | Guttinger et al. | |
| 4,363,645 A | 12/1982 | Eisenberg | |
| 4,380,462 A | 4/1983 | Shono et al. | |
| 4,556,154 A | 12/1985 | Bajtala et al. | |
| 4,601,937 A | 7/1986 | Latussek | |
| 4,773,764 A | 9/1988 | Colombani et al. | |
| 4,940,502 A | 7/1990 | Marcus | |
| 5,139,841 A | 8/1992 | Makoui et al. | |
| 5,149,394 A | 9/1992 | Held | |
| 5,284,546 A | 2/1994 | Tilby | |
| 5,330,595 A | 7/1994 | Held | |
| 5,340,651 A | 8/1994 | Esu | |
| 5,458,051 A | 10/1995 | Alden et al. | |
| 5,532,050 A | 7/1996 | Brooks | |
| 5,578,371 A | 11/1996 | Taylor et al. | |
| 5,612,405 A | 3/1997 | Bainbridge et al. | |
| 5,618,622 A | 4/1997 | Gillberg-Laforce et al. | |
| 5,634,954 A | 6/1997 | Kern | |
| 5,672,399 A | 9/1997 | Kahlbaugh et al. | |
| 5,695,848 A | 12/1997 | Wilkins et al. | |
| 5,832,696 A | 11/1998 | Nagy et al. | |
| 5,846,603 A | 12/1998 | Miller | |
| 6,054,081 A | 4/2000 | Bielfeldt | |
| 6,136,058 A | 10/2000 | Miller | |
| 6,200,682 B1 | 3/2001 | Dubelsten et al. | |
| 6,605,245 B1 | 8/2003 | Dubelsten et al. | |
| 6,821,614 B1 | 11/2004 | Dubelsten et al. | |
| 6,863,512 B2 | 3/2005 | Dubelsten et al. | |
| 8,057,566 B1 | 11/2011 | Sanders et al. | |
| 8,080,488 B2 | 12/2011 | Anderson et al. | |
| 8,393,180 B1 | 3/2013 | Sanders et al. | |
| 9,101,860 B2 | 8/2015 | Green et al. | |
| 2004/0163540 A1 | 8/2004 | Mori et al. | |
| 2005/0006808 A1 | 1/2005 | Thomas | |
| 2005/0067113 A1 | 3/2005 | Colson et al. | |
| 2005/0138832 A1 | 6/2005 | Hada et al. | |
| 2006/0093815 A1 | 5/2006 | Wilkins | |
| 2007/0049143 A1 | 3/2007 | D'Silva et al. | |
| 2008/0015201 A1 | 1/2008 | Grooms et al. | |
| 2008/0105612 A1 | 5/2008 | Chappas | |
| 2010/0139224 A1 | 6/2010 | Lim et al. | |
| 2011/0086567 A1 | 4/2011 | Hawkins et al. | |
| 2011/0114554 A1 | 5/2011 | Li et al. | |
| 2012/0255662 A1 | 10/2012 | Green | |
| 2012/0271445 A1 | 10/2012 | Li et al. | |
| 2012/0298582 A1 | 11/2012 | Kanani et al. | |
| 2012/0304603 A1 | 12/2012 | Wyss et al. | |
| 2014/0196423 A1 | 7/2014 | Barrows et al. | |

* cited by examiner

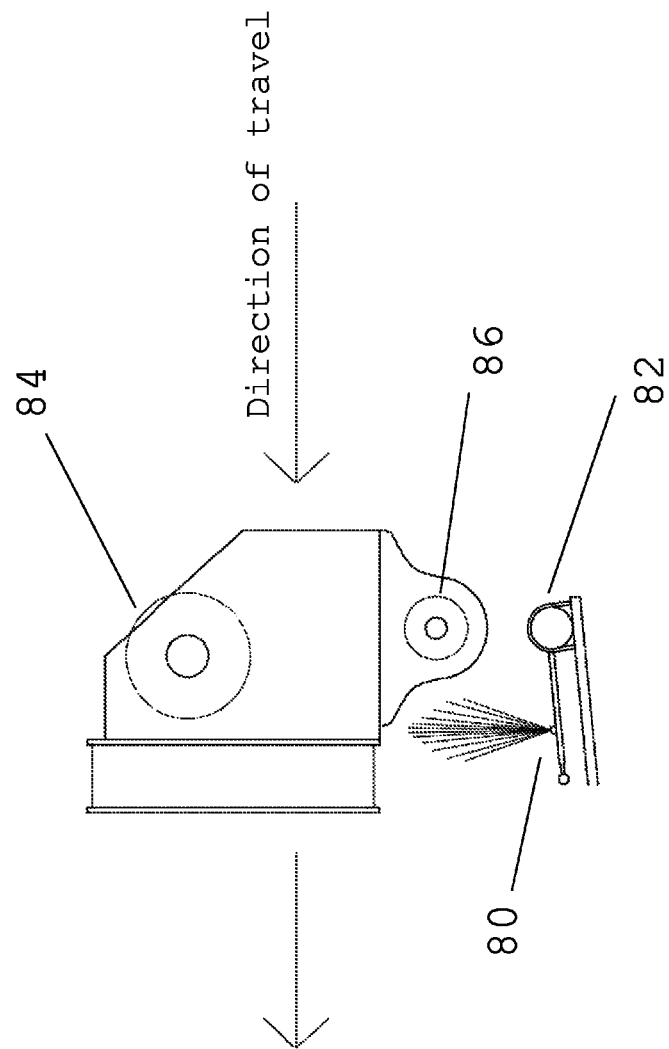

METHOD OF MANUFACTURING FIBERGLASS FILTRATION MEDIA

CROSS-REFERENCE TO RELATED APPLICATIONS

This application is a continuation of U.S. patent application Ser. No. 15/255,136, filed on Sep. 1, 2016, which is a continuation-in-part of U.S. patent application Ser. No. 15/224,175, filed on Jul. 29, 2016, which is a continuation-in-part of U.S. patent application Ser. No. 14/181,426, filed on Feb. 14, 2014, now U.S. Pat. No. 9,446,978, and which claims priority to U.S. Provisional Application No. 62/282,444, filed on Jul. 31, 2015. U.S. patent application Ser. No. 15/255,136 is also a continuation-in-part of U.S. patent application Ser. No. 15/151,478, filed on May 10, 2016, now U.S. Pat. No. 9,695,084, which claims priority to U.S. Provisional Application No. 62/179,572, filed on May 11, 2015. The foregoing applications are incorporated by reference herein in their entirety.

FIELD

This disclosure generally relates to fiberglass filtration paint arrestance media and its geometry.

BACKGROUND

Commercial and industrial spray paint and powder coating booths in the United States and elsewhere are required by various regulations to prevent significant amounts of airborne liquid coating droplets (such as paint, varnish, and polymers) or dry powder from escaping into the atmosphere. In the United States, the Environmental Protection Agency issues National Emission Standards for Hazardous Air Pollutants (NESHAP), and 40 Code of Federal Regulations, Part 63 (40 C.F.R. 63) sets standards for air emissions.

Industrial filter manufacturers continuously seek to improve the particulate removal efficiency of filter media. One approach to improve the efficiency of a filter is by providing a denser medium with smaller pores. However, one problem with this approach is that it also increases the flow resistance, which increases the pressure drop across the filter medium.

Another method for enhancing the particulate removal efficiency of a fibrous filter is to spray a tackifier agent onto the filter medium after the non-woven fibrous web has been formed and the binder on the filter has been cured. For example, oil, chlorinated paraffin, or phosphate esters may be sprayed onto a filter medium web to promote the adhesion of particles and therefore improve filtration. However, the sprayed tackifier is concentrated near the surface of the filter medium and is nearly non-existent in the interior. It is impossible to penetrate such a spray into the interior of the filter medium using known methods except by the use of excessive quantities of tackifier and at very high pressures. Furthermore, attempting to utilize such large quantities and high pressure results in a product that is oily and difficult to handle.

To assist in the understanding of the principles disclosed herein, and without limiting the scope of the disclosure, the term "paint" will generally be used to represent liquid coatings and powder coatings generally applied to surfaces by a spray nozzle in a booth in commercial and industrial applications.

Air pollution standards require a minimum flow of air through the booth for the safety and comfort of operators inside the booth and for the proper application of the paint. To accomplish this, many types of paint arrestors have been variously made of paper, high-loft polyester, fiberglass, and other materials in multiple configurations and combinations.

As the paint arrestor media becomes saturated with paint, it ultimately impedes the flow of air through the air exit of the paint booth and must be replaced with fresh paint arrestor media. Maintenance schedules for commercial and industrial spray paint booths typically determine the economic benefit of various types of paint arrestors. Booth operators prefer to interrupt the painting operation as seldom as possible for paint arrestor changes. Booths in which relatively little paint is sprayed and which are not in continuous use can use paint arrestors with less paint holding capacity. Conversely, booths that spray high volumes of paint on a more continuous basis benefit economically from using paint arrestors that hold higher amounts of paint before clogging. Existing paint arrestor media suffer from face loading, in which an undesirably high percentage of the paint droplets, of all sizes, are captured and held at the surface of the media, resulting in air pathways that are prematurely clogged with paint.

Thus there remains a considerable need for paint arrestors with improved paint holding capabilities.

SUMMARY

The present disclosure is directed to filtration media for paint arrestance with high paint holding capabilities. The principles disclosed herein relate to the construction of the media and specific geometries within the media. Such geometries are generally achieved through the use of fast and slow traverses of a melter while drawing filaments onto a rotatable drum, the subsequent expansion of the fiberglass mat, and setting the loft of the fiberglass mat during the curing process. The lofting provides geometries of the bonded glass filaments suitable for paint arrestors with high paint holding capabilities. The geometries can be controlled, and various configurations and densities of glass filaments are disclosed. Configuration and density can be changed at various depths within the loft of the media, thereby optimizing paint arrestance and paint holding capacity while maximizing airflow.

Filaments are formed at nearly right angle intersections and right angle intersections on the air exit side of the fiberglass media, and filaments are formed into bundles of varying densities on the air entrance side and the interior of the fiberglass media, thereby improving the paint holding capabilities of the fiberglass media. Each filament bundle forms generally wavy patterns, thereby creating a homogenous skin surface. Increasing the density of bundled filaments progressively and decreasing the number of filaments in each bundle causes the bundles of filaments to become finer and more numerous towards the air exit side. This configuration increases the paint holding characteristics of the finished fiberglass article.

Controlling the volumetric weight of fiberglass media permits a progressive density through the media. As disclosed herein, the volumetric weight is lower on the air intake side and higher on the air exit side. The pattern of filaments become less wavy at the air exit side, with the angle of intersection approaching 90 degrees. In some configurations, the non-bundled filaments are individual and intersect progressively, approaching a near 90-degree intersection. The formation of a homogeneous pattern on the air exit side causes the skin of the paint arrestor to capture more of the finest paint droplets.

A controller is utilized to control the traverse of a melter that deposits glass filaments onto a rotating drum. The controller controls the rotation of the drum, the weight of the glass, the surface velocity of the drum's rotation, and the manner and amount of the binder spray and, optionally, water deposited onto the rotatable drum. The melter traverses over the drum in sets of fast and slow traverses.

The disclosed methods can be used to create an article with an approximate weight of 12-40 grams per square foot and a loft of one to three inches. The skin stiffness, density, and volumetric weight, as well as thickness of the skin on the air exit side of the fiberglass media, are controlled through the use of a series of rollers with water spray heads at the entrance of the curing apparatus.

Various objects, features, aspects, and advantages of the present disclosure will become more apparent from the following detailed description along with the accompanying drawings in which like numerals represent like components.

BRIEF DESCRIPTION OF THE DRAWINGS

A complete understanding of the present disclosure may be obtained by reference to the accompanying drawings, when considered in conjunction with the subsequent, detailed description, in which:

FIG. 9 is a side view of the water spray assembly shown in FIG. 8.

DETAILED DESCRIPTION

Figure 1:
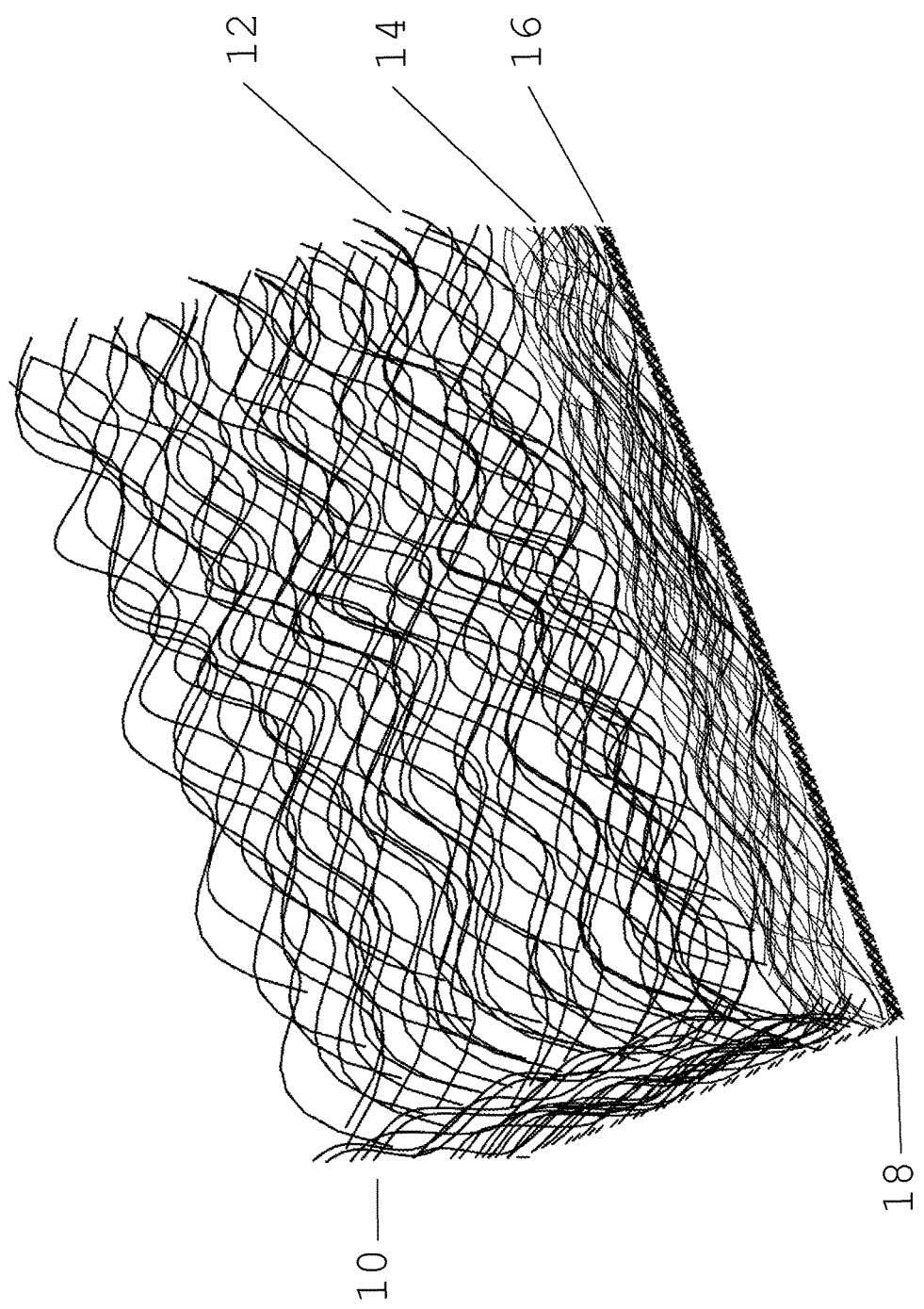
FIG. 1 is a perspective view from above the fiberglass media showing the coarse bundles of substantially parallel filaments forming a generally wavy pattern on the air intake side, the progressively denser, finer bundles approaching the air exit side, and the skin on the air exit side.

Modigliani U.S. Pat. Nos. 2,081,060; 2,546,230; and 2,913,037 generally disclose systems and methods for forming fiberglass filtration media, and are incorporated herein by reference in their entirety. To the extent a definition or use of a term herein is inconsistent with the definition or use of the term in a reference incorporated herein, the definition or use of the term herein shall apply to the disclosure herein.

Fiberglass paint arrestor may generally be manufactured using a multi-step process. First, a glass melter deposits fine glass filaments onto a rotating drum situated below it. The melter typically traverses back and forth above the rotatable drum, but in some configurations, the melter may be stationary while the rotating drum shifts longitudinally below the melter. The drum is preferably maintained at a constant rotational speed, although variations in drum speed may be used to produce thicker or thinner filaments.

The individual filaments have substantially the same diameter. For example, in some embodiments, the diameter of the individual filaments is 28 microns, plus or minus 3 microns. The melter may traverse above the rotating drum in passes (a trip from one end of the drum to the other and then back). The melter travels at a substantially constant traverse speed during a pass, the but traverse speed of the melter may vary from one pass to another. In some embodiments, the speed of the melter during a fast pass is within the range of 20 feet per minute to 35 feet per minute, and the speed of the melter during a slow pass is within the range of 4 feet per minute to 18 feet per minute. For example, the melter may traverse over the rotating drum in a repeating sequence of six slow passes followed by four fast passes. In one example, the melter traverses over the rotating drum in three stages, wherein the first stage consists of a repeating sequence of six slow passes followed by four fast passes, the second stage consists of a repeating sequence of four slow passes followed by four fast passes, and the third stage consists of a repeating sequence of only fast passes. In another example, the melter traverses over the rotating drum in three stages, wherein the first stage consists of a repeating sequence of ten slow passes followed by two fast passes, the second stage consists of a repeating sequence of six slow passes followed by two fast passes, and the third stage consists of a repeating sequence of only fast passes. In another example, the melter traverses over the rotating drum in three stages, wherein the first stage consists of a repeating sequence of twelve slow passes followed by one fast pass, the second stage consists of a repeating sequence of two slow passes followed by two fast passes, and the third stage consists of a repeating sequence of only fast passes. The weight of the final product is affected by the overall number of passes.

The glass filaments are sprayed with a binding solution, preferably urea formaldehyde, as they are deposited onto the drum or shortly after they are deposited onto the drum. In some embodiments, the binding solution is sprayed onto the filaments after they are deposited onto the drum, such as on the backside of the drum. When the desired weight of glass filaments and binder has been deposited onto the drum, the drum is stopped and the mat is cut longitudinally along the length of the drum and removed. Next, the glass mat is expanded in length and height before it is fed, or as it is fed, into a curing apparatus which both sets the final height of the loft of the mat and cures the binder. Using the foregoing process to create lofted fiberglass paint arrestor media has economic advantages over alternatives, including lower production costs and its compressibility which lowers transportation costs.

As shown in FIG. 1, filaments at the surface of an air intake side 10 of fiberglass media form into bundles that are much coarser than individual filaments. The filaments form in a substantially parallel configuration. The bundles of filaments 12 at the surface of the air intake side 10 form into a generally wavy pattern during expansion and curing in a heating apparatus. Bundled filaments 14 progressively increase in density while the number of filaments in each bundle progressively decreases approaching the air exit side of the media 18. In other words, the bundles 12 and 14 progressively become finer and more numerous toward the filaments 16 at the air exit side 18 of the media. Preferably, the individual filaments are substantially uniform in diameter, whereas the bundles of filaments vary in diameter and density. In a non-limiting example, bundles of filaments towards the air intake side of the media are approximately 76 to 202 microns in width.

While the bundles of filaments preferably increase in density in a substantially linear progression through the depth of the fiberglass media, the fiberglass media may be viewed as having different layers, wherein an air intake layer comprises coarse bundles in substantially parallel configurations, one or more interior layers have an increased density of bundles formed from fewer filaments per bundle, and an air exit layer is substantially comprised of non-bundled filaments intersecting at substantially right angles.

Figure 2:
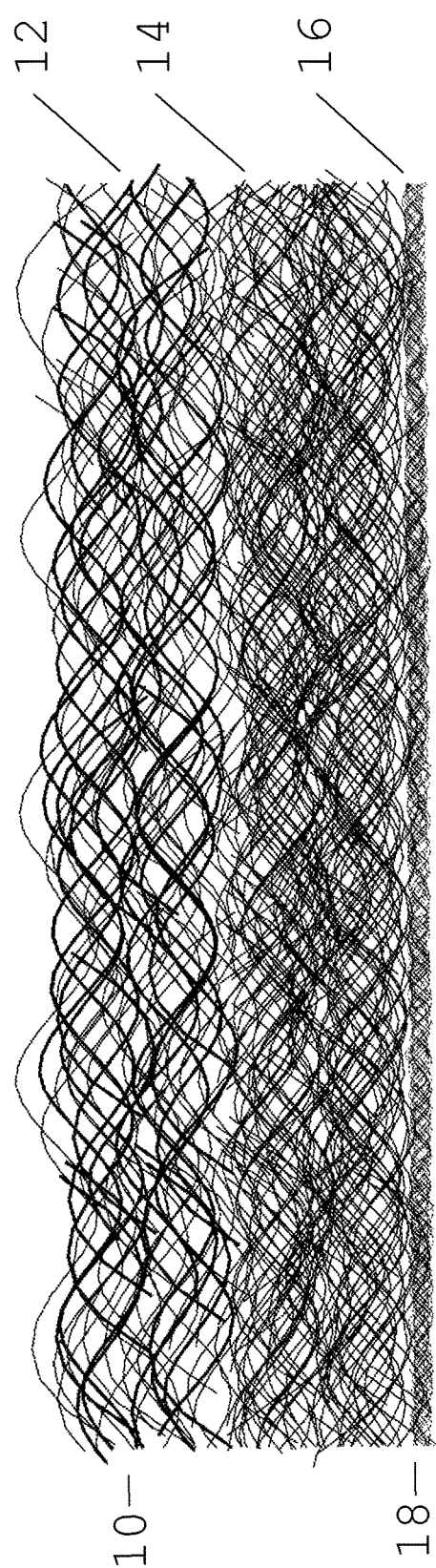
FIG. 2 is a side view of the fiberglass media illustrating the coarsest bundles of filaments on the air intake side, which are generally wavy in all three dimensions (the X-, Y-, and Z-axes). Also shown are the denser, finer bundles approaching the air exit side. At the bottom is the air exit side skin.

FIG. 2 depicts a progressive density formation in fiberglass media. A lofted manufacturing process lowers volumetric weight of the media on the air intake side 10, with the volumetric weight becoming progressively higher toward the air exit side 18. Simultaneously, the pattern of filaments 12, 14, 18 becomes less wavy from the air intake side 10 to the air exit side 18. As can be seen from FIGS. 1 and 2, the bundles of filaments form curves in the X-, Y-, and Z-axes.

Figure 3:
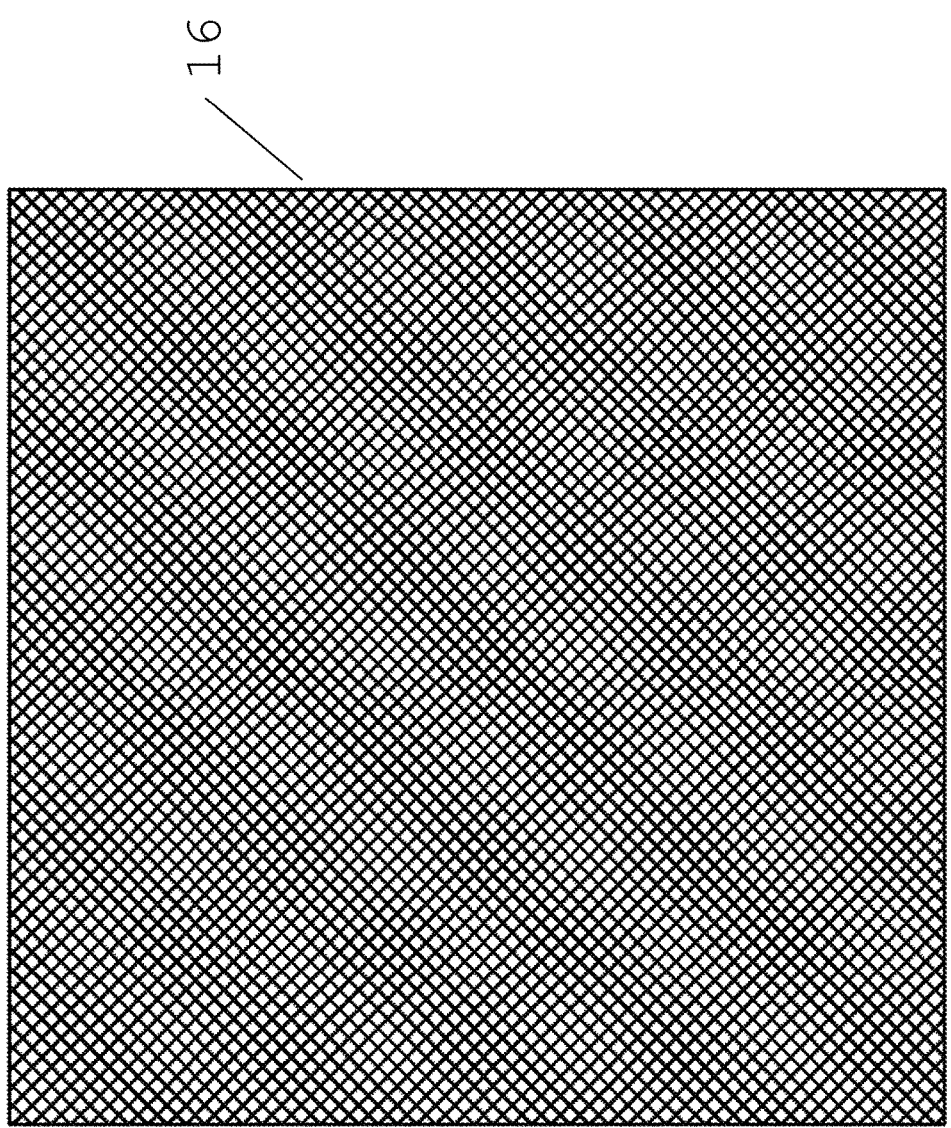
FIG. 3 is a bottom view of the air exit side skin, showing the filaments intersecting at substantially 90 degree angles.

As shown in FIG. 3, the filaments 16 begin intersecting each other at angles approaching right angles towards the air exit side 18 of the fiberglass media. Fiberglass media skin comprises 7.5% to 25% of the weight of the media and forms from non-bundled, individual filaments intersecting each other at or near 90 degree angles. The fiberglass media skin on the air exit side preferably comprises few or no bundles of filaments. The skin of the media captures the finest droplets required to meet current USEPA AIR Regulations.

Figure 4:
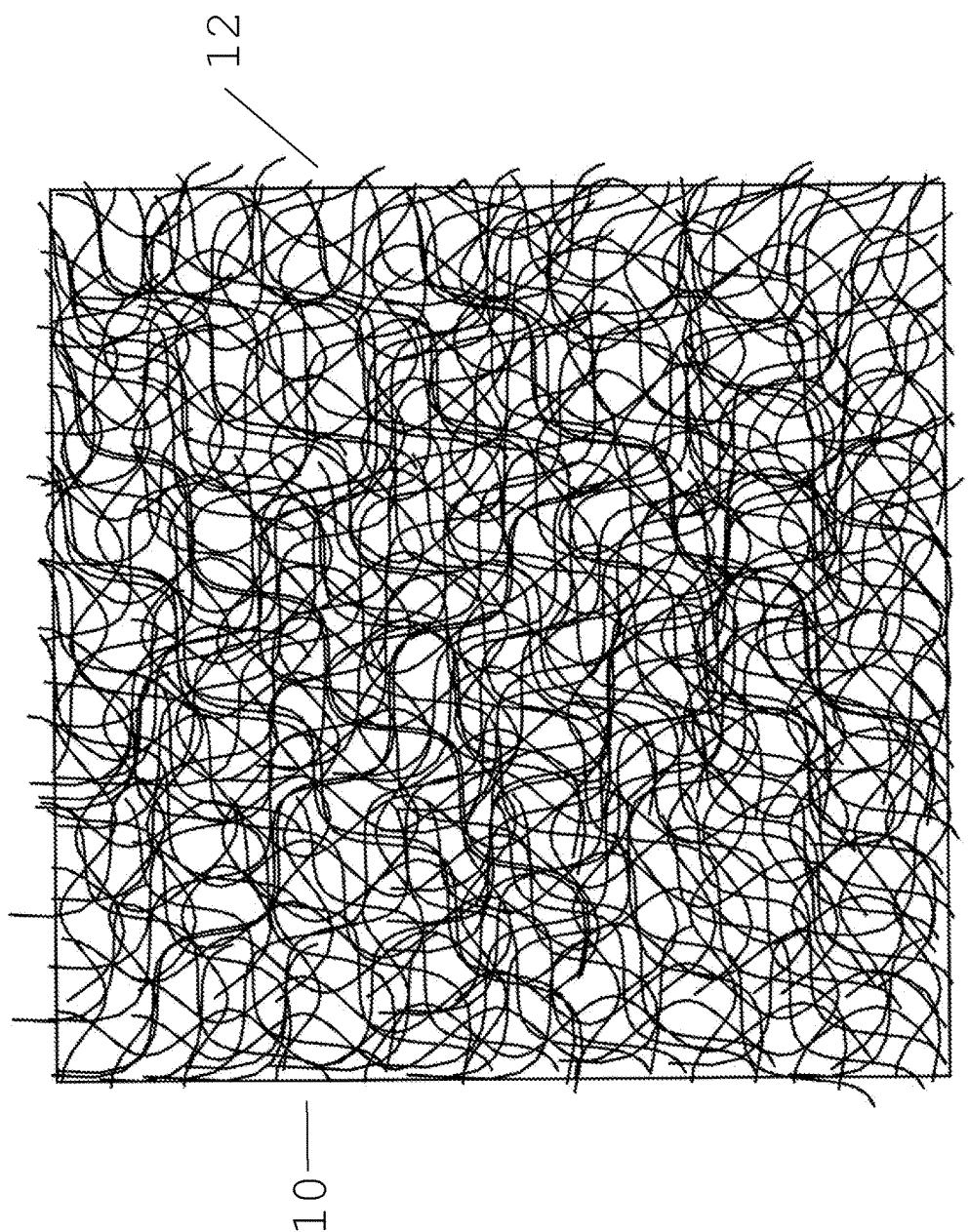
FIG. 4 is a top view of the fiberglass media illustrating the generally wavy pattern of the coarse bundles of substantially parallel filaments on the air intake side.

FIG. 4 depicts filaments 12 intersecting at substantially less than 90 degree angles towards the air intake side 10 of the fiberglass media. The acute angles of intersections of filament bundles in the longitudinal direction of travel of the mat through the curing apparatus (described later) are predominantly or entirely in the range of 60 to 90 degrees. The filament bundles towards the intake side of the media form wavy patterns that are not entirely uniform, leading to variations in the angles of intersection.

Taken together, the progressive density and angle of intersection approaching 90 degrees allow lofted fiberglass media to capture and hold the largest airborne paint droplets near the air intake surface of the media while capturing and holding progressively smaller paint droplets through the media approaching the air exit side. This structure maximizes paint arrestance and paint holding capacity while maximizing airflow.

The use of higher loft in heavier fiberglass paint arrestor media and lower loft in lighter fiberglass paint arrestor media is advantageous. The most demanding paint arrestor applications require the greatest practical volumetric weight and loft combination. The principles disclosed herein improve the effectiveness and efficiency of fiberglass paint arrestor media along a continuum of various weight and loft combinations.

Figure 5:
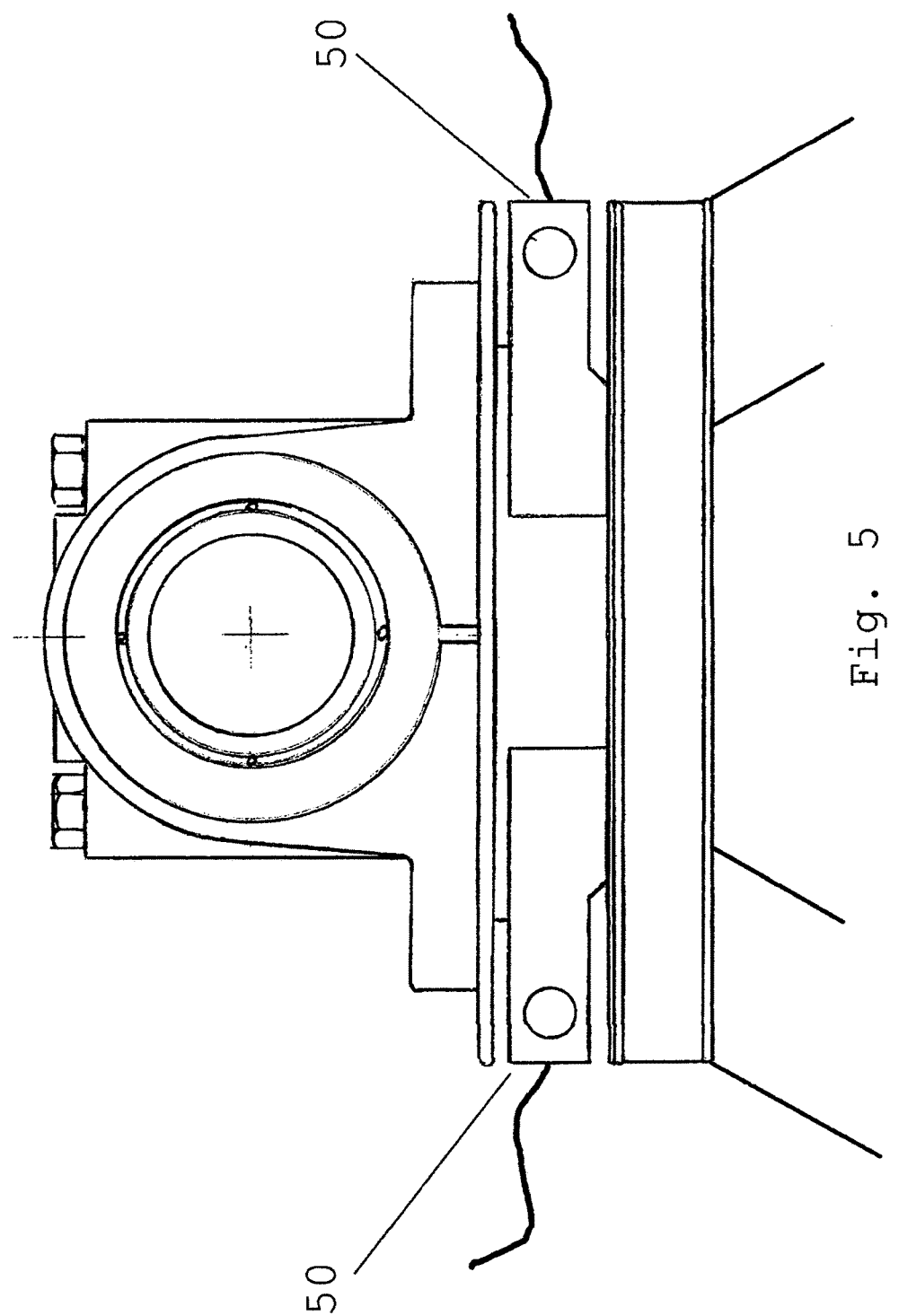
FIG. 5 is a side view of a load cell controlled by a controller.

FIG. 5 shows a load cell 50 mounted and operatively coupled to a rotatable drum, which, through the controller, measures the amount of fiberglass and binder spun onto the rotatable drum.

Figure 6:
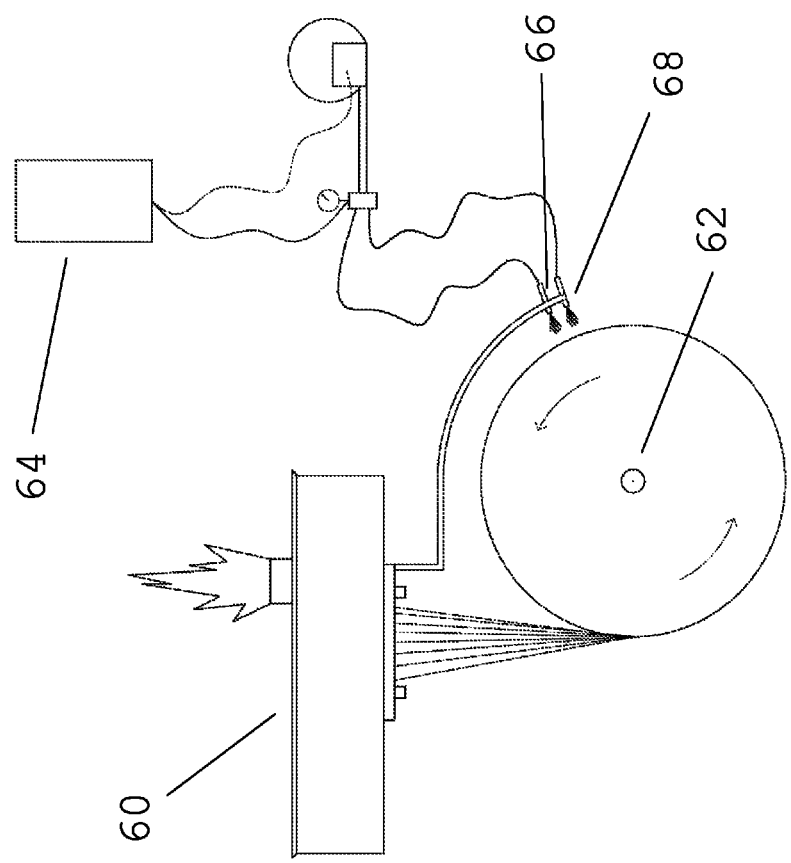
FIG. 6 is a side view of a melter, controller, rotatable drum, pump, and sprayers for spraying fiberglass being wound onto a rotatable drum.

FIG. 6 shows a glass melter 60 centered directly above the outer edge of rotatable drum 62, which is rotating below it. The controller 64 controls the temperature of the melter 60 and the traverse speed of the melter 60 through a series of multiple short and long traverses. Controller 64 also controls the rotational speed of rotatable drum 62 and thereby controls its surface velocity. Preferably, the rotational speed of rotatable drum 62 is maintained constant throughout the formation of a fiberglass mat and may be adjusted from one product to the next. However, the rotational speed of rotatable drum 62 may be varied to produce thicker or thinner filaments. The controller also controls the manner and rate at which binder is applied to the fiberglass on the rotatable drum via sprayers 66 and 68. In FIG. 6, sprayers 66 and 68 are shown on the backside of rotatable drum 62. However, sprayers 66 and 68 may be mounted on the front side in order to apply binder as glass filaments are deposited onto rotatable drum 62 or shortly thereafter.

Figure 7:
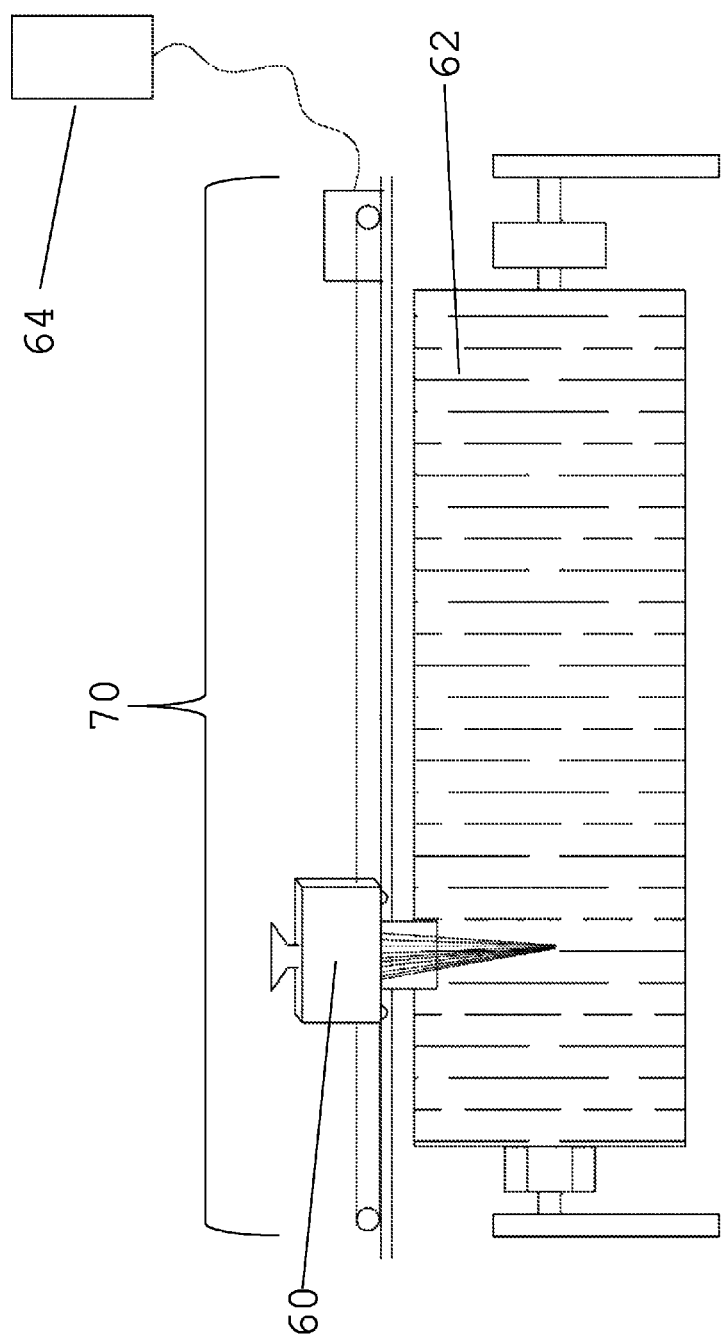
FIG. 7 shows a melter traverse of a rotatable drum and controller.

FIG. 7 shows the traverse 70 of the glass melter 60 directly above and parallel to the axis of the rotatable drum 62, which is rotating below it. Also shown is controller 64 which controls the process.

Once the fiberglass mat has been formed, it is removed from the rotatable drum and positioned on a let-off table. The leading edge of the fiberglass mat is threaded through a roller assembly comprising bowed rollers and/or straight rollers. The selection of bowed or straight rollers will depend on the final product to be manufactured. The fiberglass mat passes through an open area between the let-off table and the roller assembly and is supported by tension on the mat as it is pulled by conveyor surfaces of a curing apparatus. This tension also expands the mat. Operators inspect the uniformity of the fiberglass mat as it passes through the open area and manually pull the edges of the fiberglass mat to expand any areas of the mat that are wrinkled or only partially expanded. The operators also align the edges of the fiberglass mat with alignment indicators, which may be positioned on the roller assembly and/or on the curing apparatus. The rollers of the roller assembly remove remaining wrinkles in the fiberglass mat. If a water spray is used, the rollers also position the top and bottom surfaces of the fiberglass mat to be an appropriate distance from the water spray nozzles.

Figure 8:
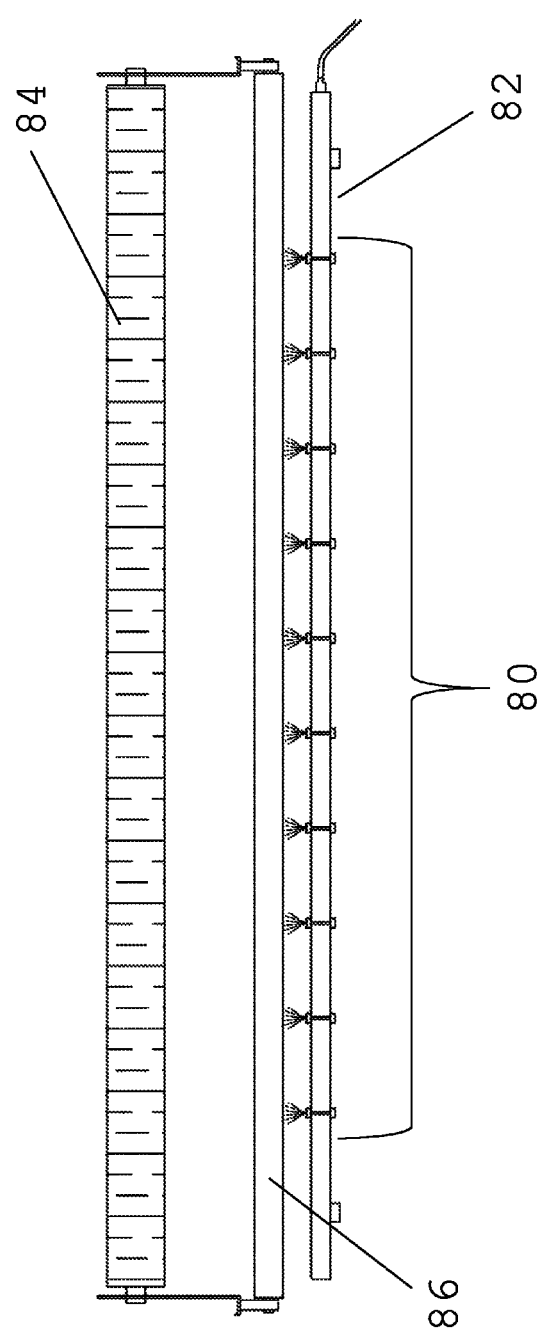
FIG. 8 depicts the water spray assembly spraying water onto the air exit side of the media as it enters the curing apparatus.

FIG. 8 depicts how the thickness and stiffness of the skin can be controlled by a roller apparatus with an optional water spray. A system of spray heads 80 spray water or aqueous solutions from a pumped sprayer assembly 82 onto the air exit side of the media as it passes through upper roller 84 and lower roller 86 at or near the entrance to the curing apparatus. A sufficient number of spray heads should be used to cover the fiberglass media as it enters the curing apparatus. It is preferred that ten or more sprays heads are used, but a lower number may be used if desired.

As shown in FIG. 9, water or aqueous solutions are sprayed from a pumped sprayer assembly 82 as the fiberglass media passes through upper roller 84 and lower roller 86. In some embodiments, the thickness and stiffness of the skin can be controlled by the use of rollers 84 and 86 which are sprayed with water or aqueous solutions so that the rollers apply the water onto the fiberglass mat as it moves through the rollers. In some embodiments, the thickness and stiffness of the skin can be controlled by spraying water or aqueous solutions directly onto the fiberglass mat as it moves through rollers 84 and 86. The roller assembly also comprises a lower framing, bearings and pumps, which have been omitted from FIG. 9 for clarity. Straight rollers engage the fiberglass mat and are used to maintain optimal width expansion.

These refinements make it practical to control with greater precision multiple variables associated with the process of manufacturing fiberglass paint arrestor media, namely spinning glass filaments onto the rotatable drum, coating those filaments with binder, and introducing the expanded fiberglass mat, with the air exit side moistened, into the curing apparatus.

In some embodiments, the controller 64 sets the rotation of rotatable drum 62 in order to maintain specific surface velocities. Controller 64 is programmed to control melter 60 through a series of sets of fast and slow traverses 70, which correspond to specific surface velocities of the rotatable drum 62. Each set is comprised of a specific number of fast traverses followed by a specific number of slow traverses. For example, the number of fast traverses may range from zero to fifty and the number of slow traverses may range from zero to fifty. In some embodiments, a mat may be formed by a series of two fast traverses, then two slow traverses, then two fast traverses, then two slow traverses, and so on. In such embodiments, the weight of the finished product will increase with the total number of traverses made by the melter. For an example of traverse speeds, the melter may move at approximately 30 feet per minute during a fast traverse and approximately 7.5 feet per minute during a slow traverse.

By arranging the order of sets and the traverse speed of each set, and through the use of water or aqueous solutions and rollers as described herein, the weight of the skin layer can be controlled to a desired density, measured in grams per square foot. This enables control of the overall progressive density of the media, the degree of bundling, and the final geometry of the bundles and filaments. Applying these principles, fiberglass paint arrestor media can be produced which has skin consisting of 7% to 25% of the weight of the fiberglass media.

With reference to FIG. 9, the fiberglass media rolls between roller 86 and roller 84, and water is applied by pumped sprayer assembly 82 to the air exit side of the media at the entrance to the curing apparatus. By controlling the operating conditions of the curing apparatus, the thickness and stiffness of the skin can be controlled.

In some embodiments, the weight per square foot of the finished fiberglass paint arrestor is controlled to be from 12 to 40 grams per square foot, + or −10%, and the loft is controlled to be from 1.0 to 3.0 inches, + or −0.5 inch. In some preferred embodiments, the weight per square foot of the finished fiberglass paint arrestor is controlled to be from 20 to 40 grams per square foot, + or −10%, and the loft is controlled to be from 1.0 to 3.0 inches, + or −0.5 inch.

The detailed description is not intended to be limiting or represent an exhaustive enumeration of the principles disclosed herein. It will be apparent to those of skill in the art that numerous changes may be made in such details without departing from the spirit of the principles disclosed herein.

We claim:

1. A method of manufacturing fiberglass media comprising:
   providing glass into a melter configured to produce glass filament strands;
   traversing the melter above a rotating drum in a first direction along a substantial length of the rotating drum followed by an opposite second direction along the substantial length of the rotating drum to define a pass;
   depositing the glass filament strands onto the rotating drum;
   traversing the melter in one or more passes at a first speed;
   traversing the melter in one or more passes at a second speed;
   wherein the second speed is faster than the first speed;
   spraying binder onto the glass filament strands on the rotating drum to form a fiberglass mat;
   removing the fiberglass mat from the rotating drum;
   expanding the fiberglass mat to produce an expanded fiberglass mat comprising non-bundled filaments intersecting at or near 90 degree angles on an air exit side of the expanded fiberglass mat, and bundled filaments on an air entrance side of the expanded fiberglass mat, wherein the bundled filaments are wavy in three dimensions, and wherein the fiberglass mat comprises progressively denser and less wavy bundles of filaments between the air entrance side and the air exit side;
   providing the expanded fiberglass mat through a spray apparatus and a roller apparatus, comprising an upper roller and a lower roller, configured to produce an air exit skin consisting of individual filaments and comprising 7.5% to 25% of the weight of the expanded fiberglass mat; and
   curing the expanded fiberglass mat in a curing apparatus.

2. The method of claim 1, comprising setting a loft of the expanded fiberglass mat between 1.0 and 3.0 inches.

3. The method of claim 1, wherein the glass filament strands are 25 to 31 microns in diameter.

4. The method of claim 1, comprising spraying water or aqueous solution onto the expanded fiberglass mat as the expanded fiberglass mat travels through the roller apparatus.

5. The method of claim 1, comprising:
   traversing the melter in a first set of one or more passes at a first speed;
   traversing the melter in a second set of one or more passes at a second speed;
   traversing the melter in a third set of one or more passes at the first speed;
   traversing the melter in a fourth set of one or more passes at the second speed; and
   wherein the second speed is faster than the first speed.

6. The method of claim 1,
   wherein the first speed is in the range of 4 to 18 feet per minute; and
   wherein the second speed is in the range of 20 to 35 feet per minute.

7. The method of claim 1, comprising expanding the fiberglass mat to a density of between 12 and 40 grams per square foot.

8. A method of manufacturing fiberglass media comprising:
   providing glass into a melter configured to produce glass filament strands;
   traversing the melter above a rotating drum in a first direction along a substantial length of the rotating drum followed by an opposite second direction along the substantial length of the rotating drum to define a pass;
   depositing the glass filament strands onto the rotating drum;
   traversing the melter in one or more passes at a first speed followed by one or more passes at a second speed to define a stage;
   wherein the second speed is faster than the first speed;
   traversing the melter in two or more stages;
   spraying binder onto the glass filament strands on the rotating drum to form a fiberglass mat;
   removing the fiberglass mat from the rotating drum;
   expanding the fiberglass mat to produce an expanded fiberglass mat comprising non-bundled filaments intersecting at or near 90 degree angles on an air exit side of the expanded fiberglass mat and bundled filaments on an air entrance side of the expanded fiberglass mat, wherein the bundled filaments are wavy in three dimensions, and wherein the fiberglass mat comprises progressively denser and less wavy bundles of filaments between the air entrance side and the air exit side;

providing the expanded fiberglass mat through a spray apparatus and a roller apparatus, comprising an upper roller and a lower roller, configured to produce an air exit skin consisting of individual filaments and comprising 7.5% to 25% of the weight of the expanded fiberglass mat; and curing the expanded fiberglass mat in a curing apparatus.

9. The method of claim 8, comprising setting a loft of the expanded fiberglass mat between 1.0 and 3.0 inches.

10. The method of claim 8, wherein the glass filament strands are 25 to 31 microns in diameter.

11. The method of claim 8, comprising spraying water or aqueous solution onto the expanded fiberglass mat as the expanded fiberglass mat travels through the roller apparatus.

12. The method of claim 8, comprising:
traversing the melter in a first stage comprising six passes at the first speed followed by four passes at the second speed; and
traversing the melter in a second stage comprising four passes at the first speed followed by two passes at the second speed.

13. The method of claim 12, comprising:
subsequent to the second stage, traversing the melter in a third stage comprising one or more passes at the first speed followed by one or more passes at the second speed.

14. The method of claim 12, comprising:
subsequent to the second stage, traversing the melter in two or more passes at the second speed.

15. The method of claim 8, comprising:
traversing the melter in a first stage comprising twelve passes at the first speed followed by one pass at the second speed; and
traversing the melter in a second stage comprising two passes at the first speed followed by two passes at the second speed.

16. The method of claim 15, comprising:
subsequent to the second stage, traversing the melter in a third stage comprising one or more passes at the first speed followed by one or more passes at the second speed.

17. The method of claim 15, comprising:
subsequent to the second stage, traversing the melter in two or more passes at the second speed.

18. The method of claim 8,
wherein the first speed is in the range of 4 to 18 feet per minute; and
wherein the second speed is in the range of 20 to 35 feet per minute.

19. The method of claim 8, comprising expanding the fiberglass mat to a density of between 12 and 40 grams per square foot.

* * * * *